US010790906B2

(12) United States Patent
Giorgi et al.

(10) Patent No.: US 10,790,906 B2
(45) Date of Patent: Sep. 29, 2020

(54) DATA CENTER NETWORK NODE (71) Applicant: Telefonaktiebolaget LM Ericsson (publ), Stockholm (SE)

(72) Inventors: Luca Giorgi, Ponsacco (IT); Giulio Bottari, Leghorn (IT); Antonio D'Errico, Calci (IT); Francesco Giurlanda, Pisa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/338,522

(22) PCT Filed: Oct. 3, 2016

(86) PCT No.: PCT/EP2016/073585
§ 371 (c)(1),
(2) Date: Apr. 1, 2019

(87) PCT Pub. No.: WO2018/065031
PCT Pub. Date: Apr. 12, 2018

(65) Prior Publication Data
US 2020/0044740 A1    Feb. 6, 2020

(51) Int. Cl.
*H04B 10/2581*    (2013.01)
*G02B 6/02*    (2006.01)
(Continued)

(52) U.S. Cl.
CPC ..... *H04B 10/2581* (2013.01); *G02B 6/02042* (2013.01); *H04J 14/0267* (2013.01); *H04Q 11/0005* (2013.01); *H04Q 11/0062* (2013.01); *H04B 10/40* (2013.01); *H04B 10/50* (2013.01); *H04B 10/60* (2013.01); *H04J 14/02* (2013.01); *H04Q 3/00* (2013.01)

(58) Field of Classification Search
None
See application file for complete search history.

(56) References Cited

U.S. PATENT DOCUMENTS

2009/0028551 A1* 1/2009 Mei ............... H04B 10/40
                                                     398/25
2014/0241712 A1* 8/2014 Sugawara ........ G02B 6/02042
                                                     398/5
(Continued)

OTHER PUBLICATIONS

Kamchevska, V. et al., "Experimental Demonstration of Multidimensional Switching Nodes for All-Optical Data Center Networks", Journal of Lightwave Technology, vol. 34, No. 8, Apr. 15, 2016, pp. 1837-1843, IEEE.

(Continued)

*Primary Examiner* — Darren E Wolf
(74) *Attorney, Agent, or Firm* — Coats & Bennett, PLLC (57) ABSTRACT A data center network node (28) comprises one or more switch (18,19,22,23) configured to link an optical transceiver (16,17) to an optical connection comprising a multi-core optical fiber (30) having a plurality of cores (31). For each core (31), the one or more switch (18,19,22,23) is configurable between a first configuration in which an optical signal on a said core (31) of the multi-core optical fiber bypasses the optical transceiver and a second configuration in which the optical transceiver is optically linked to the said core (31) of the multi-core optical fiber (30).

12 Claims, 8 Drawing Sheets (51) Int. Cl.
*H04J 14/02* (2006.01)
*H04Q 11/00* (2006.01)
*H04Q 3/00* (2006.01)
*H04B 10/50* (2013.01)
*H04B 10/60* (2013.01)
*H04B 10/40* (2013.01)

(56) References Cited

U.S. PATENT DOCUMENTS

2015/0237421 A1* 8/2015 Morgan ............. H04Q 11/0005
398/45
2018/0063607 A1* 3/2018 Xia .................... H04B 10/2581

OTHER PUBLICATIONS

Polatis, "SDN-Enabled All-Optical Circuit Switching: An Answer to Data Center Bandwidth Challenges", White Paper, Feb. 26, 2015, pp. 1-6, Polatis.

* cited by examiner

DATA CENTER NETWORK NODE

TECHNICAL FIELD

The disclosure relates to a data center network node, a data center network controller, and a method of operating a node in a data center network or a data center network.

BACKGROUND

Figure 1:
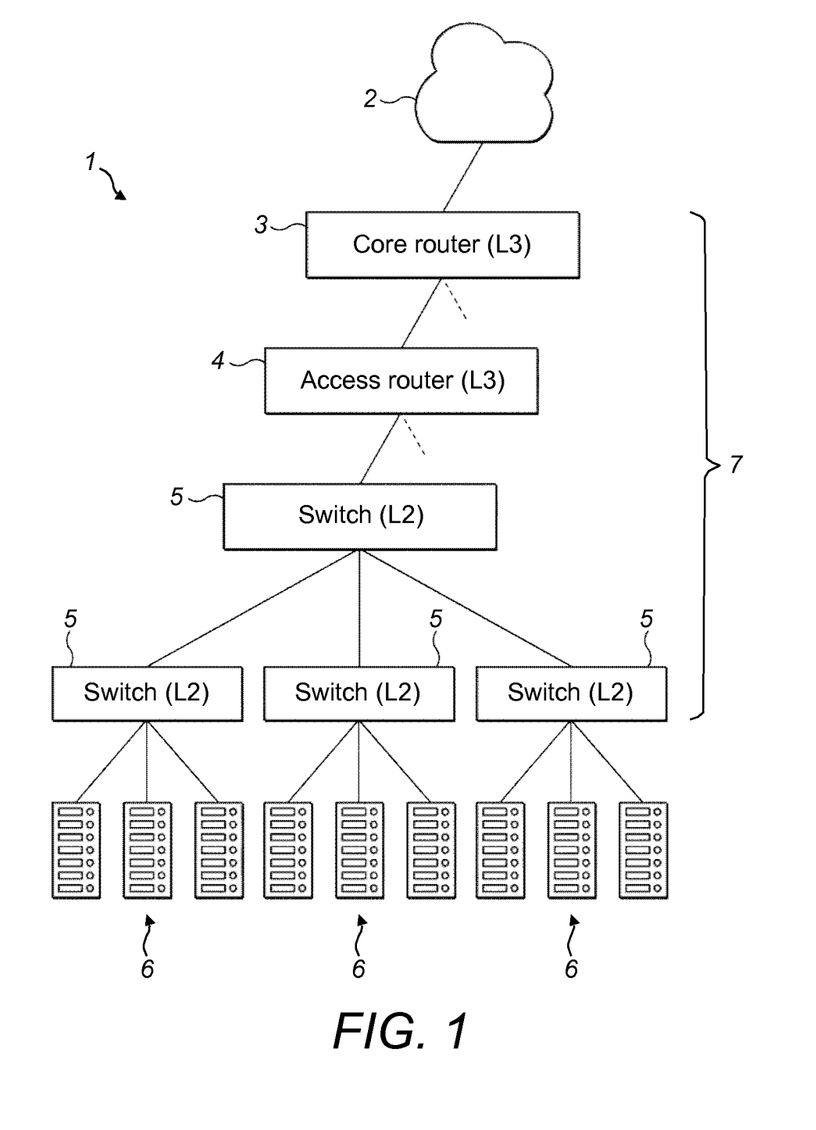
FIG. 1 is a schematic diagram of a traditional hierarchical data center network according to the prior art.

FIG. 1 is a schematic diagram of a traditional data center network in a data center 1. This shows a hierarchical architecture in which the bulk of the traffic is between servers 6 of the data center and the outside network, so-called "north-south" traffic. The data center 1 comprises a plurality of servers 6 which may be connected to external networks 2 by a packet switched network 7. For example, the packet switched network 7 comprises one or more Layer 2 switches 5, arranged in one or more levels, providing a connection between servers 6 and an access router 4. The access router 4 is connected to a core router 3, e.g. operating at Layer 3, which is connected to the external networks 2.

With the advent of cloud computing, the data patterns in such networks have changed. In particular, traffic flows between workloads are no longer contained in a single physical server. As a consequence, each server handles multiple workloads. Thus, there is a continuous need to exchange data among servers 6 inside a data center. Instead of "north-south" traffic being predominant, the bulk of the traffic may now be "east-west", between servers 6.

The data center may generate large data flows, known as "elephant flows", which typically originate from server back-up or virtual machine migration. Elephant flows are comparatively rare, but when they are present, they can dominate a data center packet switched network 7 at the expense of smaller so-called "mice flows". This can have a highly detrimental effect on the quality of service of mice flows, which are typically delay sensitive. "Mice" flows may be characterized as being latency sensitive short-lived flows, typical of active interaction among machines and real time processing. "Elephant" flows may be characterized as bandwidth intensive flows, for which throughput is more important than latency. Elephant packet flows may be characterized by being small in number, but long in time and high in traffic volume. Elephant flows may further be considered as having a relatively large size, e.g. larger than a threshold. Elephant flows tend to fill network buffers end-to-end and to introduce big delays to the latency-sensitive mice flows which share the same buffers. The result is a performance degradation of the internal network.

One solution to this problem is the use of a separate offload network for elephant flows. The offload network may utilize optical communications between servers.

Moving these elephant flows from the packet switched network to a dedicated optical network is beneficial for both the elephant flows as well as the packet switched network 7. Elephant flows over optical paths would benefit from receiving better Quality of Service because, at the optical level, there is no jitter and more bandwidth. At the same time, the packet network would be off-loaded and therefore offer better Quality of Service to the remaining, smaller packet flows.

An optical network which provides for effectively offloading elephant flows from existing servers is desired.

SUMMARY

Accordingly, in a first aspect of the present disclosure, there is provided a data center network node comprising one or more switch configured to link an optical transceiver to an optical connection comprising a multi-core optical fiber having a plurality of cores. For each core, the one or more switch is configurable between a first configuration in which an optical signal on a said core of the multi-core optical fiber bypasses the optical transceiver and a second configuration in which the optical transceiver is optically linked to the said core of the multi-core optical fiber.

This arrangement has the advantage of providing an optical offload to provide for elephant flows.

In some examples, the one or more switch comprises one or more primary switch configured to connect the optical transceiver to at least a selected one of the cores of the multi-core optical fiber. The one or more switch further comprises one or more secondary switch configurable between the first configuration and the second configuration, wherein the one or more secondary switch in the second configuration is configured to connect the said core of the multi-core fiber to a said primary switch.

In some examples, in the second configuration, the one or more primary switch is configured to connect the optical transceiver to a selected said secondary switch for connection to the at least one selected core of the multi-core optical fiber.

In some examples, the one or more primary switch and one or more secondary switch comprises a first primary switch connected to a set of first secondary switches, and a second primary switch connected to a set of second secondary switches. A said first secondary switch and a said second secondary switch is connected to a said core of the multi-core fiber.

In some examples, the first primary switch is configured to communicate with a first section of multi-core optical fiber and the second primary switch is configured to communicate with a second section of multi-core optical fiber.

In some examples, the data center network node comprises a bi-directional module comprising optical components. The optical components are configured to switch an optical signal transmitted from the transceiver to the one or more switch for communication in a selected direction of the multi-core optical fiber. The optical components are further configured to couple an optical signal received from either direction of the multi-core optical fiber to the transceiver.

A further embodiment provides a method of operating a node in a data center network, the method comprising configuring one or more switch to link an optical transceiver to an optical connection comprising a multi-core optical fiber having a plurality of cores. For each core, the one or more switch is configured in a first configuration in which an optical signal on a said core of the multi-core optical fiber bypasses the optical transceiver or a second configuration in which the optical transceiver is optically linked to the said core of the multi-core optical fiber.

In some examples, the configuring one or more switch comprises configuring one or more primary switch to connect the optical transceiver to at least a selected one of the cores of the multi-core optical fiber. The method further comprises configuring one or more secondary switch to the first configuration or the second configuration, wherein the one or more secondary switch in the second configuration is configured to connect the said core of the multi-core fiber to a said primary switch.

In some examples, the method comprises configuring optical components of a bi-directional module to switch an optical signal transmitted from the transceiver to the one or more switch for communication in a selected direction of the multi-core optical fiber.

A further embodiment provides a method of operating a data center network, the network comprising a plurality of nodes connected by sections of a multi-core optical fiber. The method comprises identifying a flow between a first node and a second node of the plurality of nodes for communication by the multi-core optical fiber and configuring one or more switch of the first node to connect a transceiver of the first node to a core of the multi-core optical fiber. The method further comprises configuring one or more switch of the second node to connect a transceiver of the second node to the core of the multi-core optical fiber.

In some examples, the method comprises configuring the one or more switch of a third node of the plurality of nodes such that an optical signal transmitted between the first and second nodes bypasses a transceiver of the third node.

A further embodiment provides a data center network controller is configured to control a network comprising a plurality of nodes connected by sections of a multi-core optical fiber. The data center network controller configured to identify a flow between a first node and a second node of the plurality of nodes for communication by the multi-core optical fiber. The data center network controller configured to control one or more switch of the first node to connect a transceiver of the first node to a core of the multi-core optical fiber. The data center network controller configured to control one or more switch of the second node to connect a transceiver of the second node to the core of the multi-core optical fiber.

In some examples, the data center network controller is configured transmit control signals to a network node to configure the one or more switch of the first node and second node.

A further embodiment provides a data center network node comprising a processor and a memory, the memory containing instructions executable by the processor whereby the data center network node is operative to configure one or more switch to link an optical transceiver to an optical connection comprising a multi-core optical fiber having a plurality of cores. For each core, the processor and memory configure the one or more switch in a first configuration in which an optical signal on a said core of the multi-core optical fiber bypasses the optical transceiver or a second configuration in which the optical transceiver is optically linked to the said core of the multi-core optical fiber.

A further embodiment provides a data center network controller comprising a processor and a memory, the memory containing instructions executable by the processor whereby the data center network controller is operative to identify a flow between a first node and a second node of the plurality of nodes for communication by the multi-core optical fiber. The processor and memory configure one or more switch of the first node to connect a transceiver of the first node to a core of the multi-core optical fiber; and configure one or more switch of the second node to connect a transceiver of the second node to the core of the multi-core optical fiber.

A further embodiment provides a data center network node comprises a controller module configured to control one or more switch configured to link an optical transceiver to an optical connection comprising a multi-core optical fiber having a plurality of cores. For each core, the controller module is configured to control the one or more switch between a first configuration in which an optical signal on a said core of the multi-core optical fiber bypasses the optical transceiver and a second configuration in which the optical transceiver is optically linked to the said core of the multi-core optical fiber.

A further embodiment provides a data center network controller configured to control a network comprising a plurality of nodes connected by sections of a multi-core optical fiber. The data center network controller comprising a controller module configured to identify a flow between a first node and a second node of the plurality of nodes for communication by the multi-core optical fiber. The controller module is configured to control one or more switch of the first node to connect a transceiver of the first node to a core of the multi-core optical fiber. The controller module is configured to control one or more switch of the second node to connect a transceiver of the second node to the core of the multi-core optical fiber.

A further embodiment provides a computer program, comprising instructions which, when executed on at least one processor, cause the at least one processor to carry out a method according to any example.

A further embodiment provides a computer program product comprising a computer program as claimed in any example.

BRIEF DESCRIPTION OF THE DRAWINGS

The above and other aspects of the present disclosure will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure.

Figure 2:
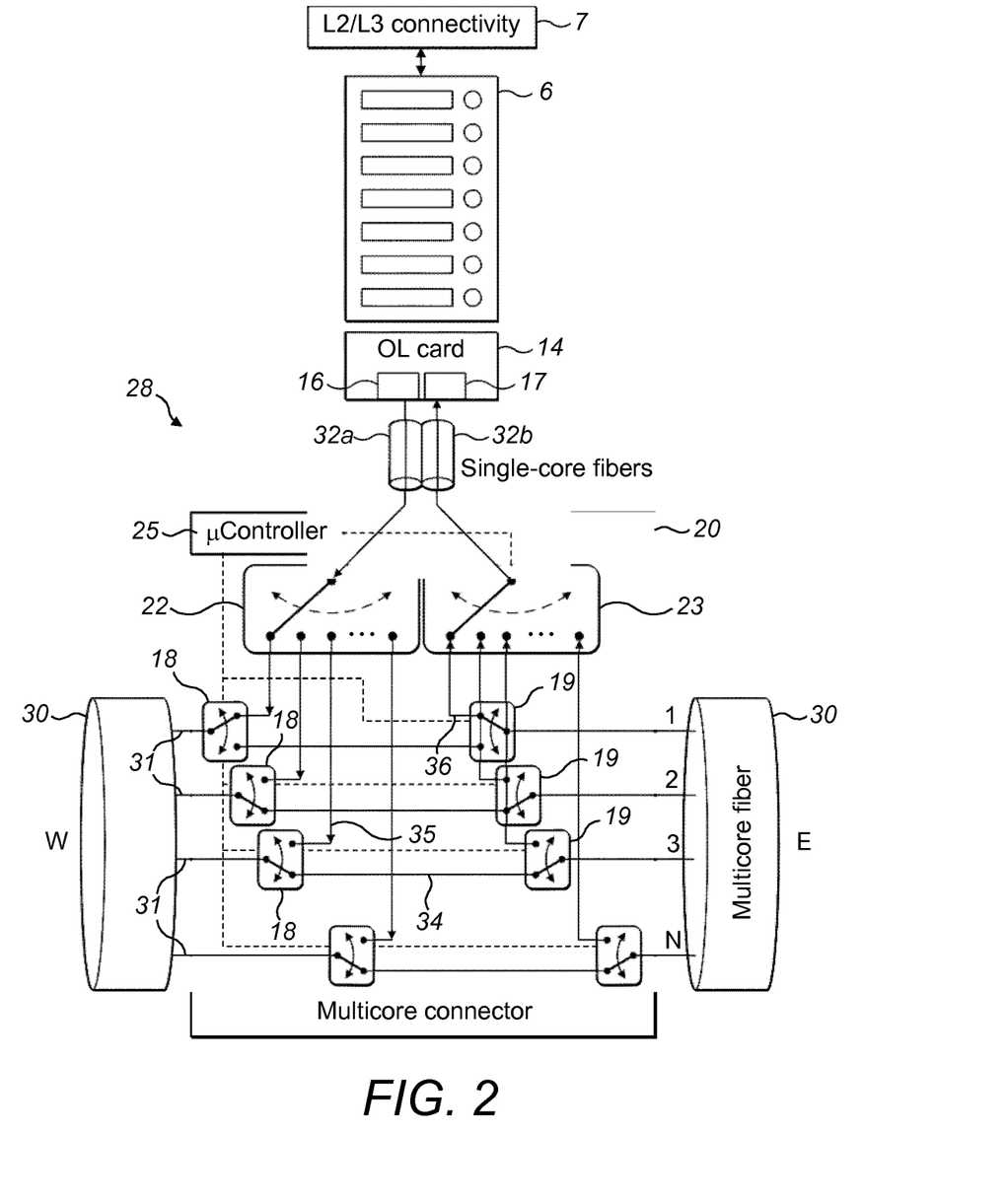
FIG. 2 is a schematic diagram of a network node according to an example of the disclosure.

FIG. 2 is a schematic diagram of an optical network node 28 comprising a data center optical switching arrangement 20 configured to provide connectivity for one or more servers 6 in a data center. The optical switching arrangement 20 is configured to provide an optical connection of the servers 6 to an optical offload network, e.g. for carrying large volumes of traffic within the data center, which may be referred to as elephant flows. The servers 6 have an additional connection to a packet switched network 7, for communication with other servers in the data center and/or external networks. In some examples, a network node may be considered as comprising both the optical node and a connection to the packet switched network. The packet switched network 7 may be as described in FIG. 1, e.g. comprising one or more of: one or more Layer 2 switches 5, arranged in one or more levels, providing a connection between servers 6 and an access router 4 connected to a core router 3, e.g. operating at Layer 3, which is connected to the external networks 2.

The servers 6 are connected to the optical switching arrangement 20 with an optical line (OL) card 14. The OL card may be considered as an offload card.

The optical line card 14 provides for connection of one or more servers 6 to the optical offload network. The optical line card 14 is configured to function as a media converter between electrical signals (e.g. a packet based protocol such as Ethernet) and optical signals. The optical line card 14 comprises an optical transmitter 16 and an optical receiver 17. The optical transmitter 16 and the optical receiver 17 may together be considered as an optical transceiver. The optical transmitter 16 and optical receiver 17 are optically connected to the optical switching arrangement 20, e.g. with one or more single core fibers. The transmitter 16 is optically connected to the optical switching arrangement 20 with a first single core fiber 32a, and the receiver 17 is optically connected to the optical switching arrangement 20 with a second single core fiber 32b. The combination of the optical line card 14, optical switching arrangement 20 and connecting single core fibers 32a,32b may be referred to as an optical network node 28.

The optical switching arrangement 20 comprises one or more, or a plurality, of switches configured to connect the optical line card 14 as a part of an optical offload network. The optical offload network comprises a plurality of optical switching arrangement 20 connected by a plurality of optical channels. In this examples, the optical switching arrangements 20 are connected by sections of a multi-core optical fiber 30. The sections of multi-core fiber connect the nodes 28, e.g. in a ring. In this example, the network node 28 is connected to two sections of multi-core fiber for transmission and receiving in two directions, i.e. East (E) and West (W). The multi-core optical fiber 30 comprises a plurality of separate cores 31, each core 31 configured to independently carry an optical signal on the multi-core optical fiber 30 as a part of the optical offload network. The optical switching arrangement 20 is configured to selectively connect one or more of the cores 31 for transmission of data from the server 6, and configured to selectively connect one or more of the cores 31 for reception of data by the server 6.

The optical switching arrangement 20 comprises one or more switches, e.g. a plurality of switches, configured to selectively connect one or more cores 31 with an interface of the optical switching arrangement 20, e.g. the interface connected to the optical line card 14. The optical switching arrangement 20 provides for control of transmission and reception of data on one or more selected cores 31 of the optical offload network.

For each core 31, the one or more switch is configurable between a first configuration in which an optical signal on a said core of the multi-core optical fiber bypasses the optical transceiver and a second configuration in which the optical transceiver is optically linked to the said core 31 of the multi-core optical fiber 30. The first or second configuration may be independently selected for each core 31, e.g. to select none, one or more cores 31 to transmit an optical signal, to select none, one or more cores 31 to receive an optical signal, and to select none, one or more cores 31 to bypass an optical signal.

The optical switching arrangement 20 comprises one or more, e.g. a plurality, of primary switches 22,23. In this example, the optical switching arrangement 20 comprises two primary switches 22,23; a first primary switch 22 for transmission of an optical signal and a second primary switch 23 for reception of an optical signal. The primary switches 22,23 are configured to select which core 31 of the multi-core fiber of the multi-core optical fiber 30 is connected to the servers 6 for transmission or reception of data.

The optical switching arrangement 20 further comprises a plurality of secondary switches 18,19. The secondary switches 18,19 comprise a first set of secondary switches 18, the first set comprising a secondary switch 18 connected with each of the plurality of the cores 31. The first set of secondary 18 switches are connected to the first primary switch 22 by optical connections 35. The secondary switches 18,19 comprise a second set of secondary switches 19, the second set comprising a secondary switch 19 connected with each of the plurality of the cores 31. The second set of secondary 19 switches are connected to the second primary switch 23 by optical connections 36.

The secondary switches 18,19 control an optical signal on the associated core 31 being passed (or copied) to/from the server 6, i.e. via the connected primary switch 22,23 and optical line card 14. In this example, the first set of secondary switches 18 are configured to receive optical signals for transmission from the first primary switch 22, and switch the signals onto the connected core 31 for transmission. The second set of secondary switches 19 are configured to receive optical signals for reception from a connected core 31, and switch the signals onto the connected second primary switch 23. This configuration of the primary and secondary switches corresponds to the second configuration in which the optical transceiver is optically linked to the said core 31 of the multi-core optical fiber 30.

The secondary switches 18,19 are further configured to bypass an optical signal received from the optical offload network. The secondary switches 18,19 have an output to an optical connection 34 which connects a switch of the first set of secondary switches 18 with a switch of the second set of secondary switches 19. The bypass may be considered as a bypass of the optical line card 14, server 6 and/or the primary switches 22,23. Thus, an optical signal received by the optical switching arrangement 20 on the optical offload network may be selected to bypass the server 6, or be received (i.e. dropped) to the server 6. A bypassing signal remains as an optical signal during the bypass, so no conversion to and from an electrical signal is required. This configuration of the secondary switches 18,19 provides the first configuration in which an optical signal on a said core of the multi-core optical fiber bypasses the optical transceiver The first and second primary switches 22,23, and the first and second secondary switches 18,19, are controlled by a node controller 25. In this example, the node controller 25 is located in the switching arrangement 20, but alternatively may be at any location connected to the first and second primary switches 22,23, and the first and second secondary switches 18,19. The switches 18,19,22,23 are independently controllable, such that transmission and reception of data may be on the same or different cores 31. In some examples, the primary and/or secondary switches are fiber switches, for example based on steering mirrors.

In operation, the node controller 25 configures (i.e. sets-up) the primary and secondary switches to receive and transmit data on one or more determined core 31 of the multi-core optical fiber 30 from/to another optical switching arrangement 20 (or optical network node 28) of the data center, and/or bypass a received optical signal. The node controllers 25 of the optical switching arrangements 20 connected by the optical offload network are controlled by a network controller (not shown), for example via a common serial interface. The network controller provides settings information and/or reprogramming, e.g. in a control signal, for the switches in the optical switching arrangements.

For transmitting or receiving data, the primary switch 22,23 is configured to connect the optical line card 14, to a selected secondary switch 18,19 via a connection 35,36. The selected secondary switch 18,19 is configured to connect the connection 35,36 to the associated core 31.

Data from the server 6 is converted from an electrical format to an optical signal in the optical line card 14, and transmitted by transmitter 16 into single core optical fiber 32*a*. The single core optical fiber 32*a* carries the optical signal to the first primary switch 18, where the optical signal is switched to connection 35, and switched by a first secondary switch 18 to a core 31 and hence onto the multi-core optical fiber 30.

For receiving data, an optical signal is received from a core 31 on a second secondary switch 19, and switched onto a connection 36. The second primary switch 23 receives the optical signal, and switches the optical signal to the single core fiber 32*b*. The single core fiber 32*b* carries the optical signal to the optical line card 14. The optical line card 14 converts the received optical signal to an electronic format and passed to a server 6.

The optical switching arrangement 20 is an all-optical device, i.e. only optical data signals are input and output with no conversion to an electrical data signal.

Figure 3A:
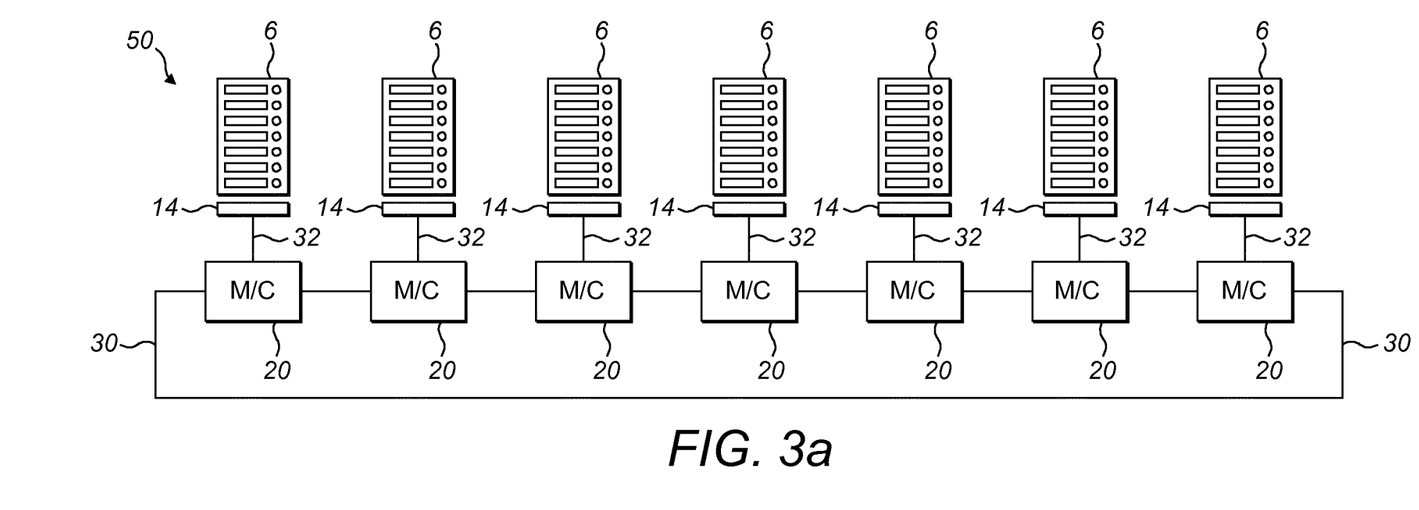
FIGS. 3a and 3b are schematic diagrams of an optical offload network according to a physical and logical view of an example of the disclosure, respectively.

FIG. 3*a* shows an example of an optical offload network 50, comprising a plurality of optical network nodes comprising switching arrangements 20 connected by sections of multi-core optical fiber 30. Each of the one or more servers 6 at a network node has a corresponding optical network node 28. In some aspects, the optical offload network 50 may be considered as comprising the optical line cards 14 or optical network nodes 28. A pair of single core optical fibers 32 provide an optical connection between the optical line card 14 and the switching arrangement 20 at each network node. The optical offload network 50 is topologically arranged in a ring. The ring may be considered as a multi-core optical fiber ring. Optical signals may pass around the ring in a single direction or in both directions. Logically, the optical offload network 50 provides a point-to-point connection whose end points can be dynamically changed. As described above, data can be transmitted from one server 6 to another sever 6 on the optical offload network 50 by setting of the optical switching arrangements 20 to transmit an optical signal onto a core 31 of the multi-core optical fiber 30 (transmitting optical switching arrangement 20), receive the optical signal from the core 31 (receiving optical switching arrangement 20), or bypass the optical signal (intermediate optical switching arrangement(s) 20).

Figure 3B:
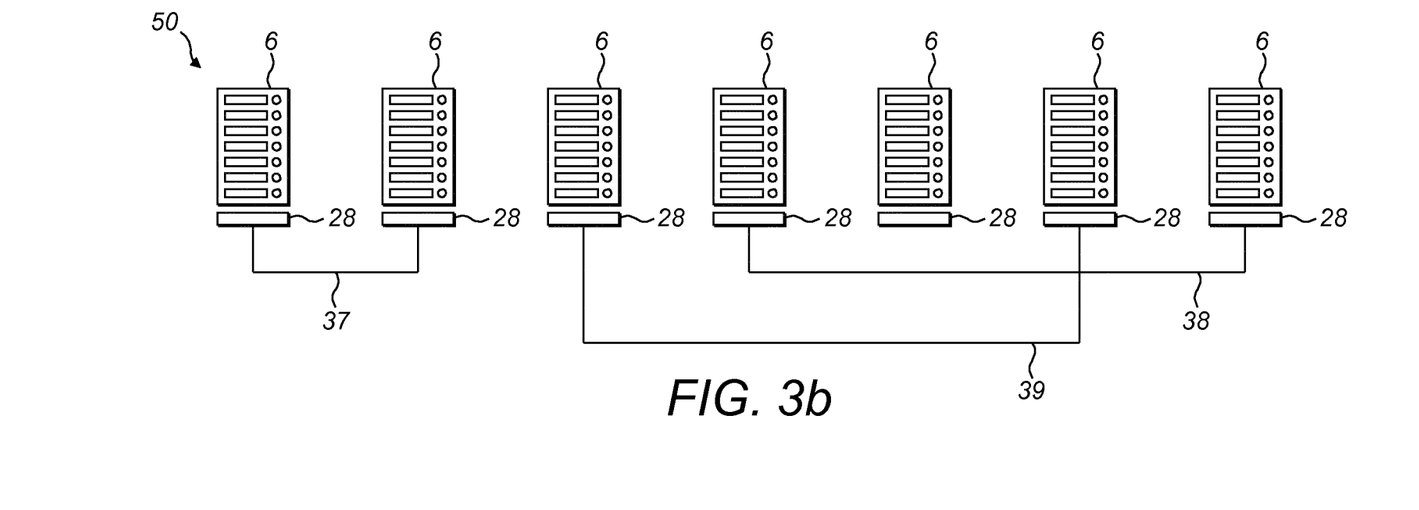

FIG. 3*b* shows a logical view of the optical offload network 50. Optical network nodes 28 connected to each one or more server 6 provides for a point-to-point connection with another of the one or more servers 6. In this example, three point-to-point connections 37,38,39 are shown. Each connection 37,38,39 uses a different core 31 of the multi-core optical fiber 30. Thus, three cores 31 of the multi-core optical fiber 30 are used to provide the connections 37,38,39 shown. A multi-core optical fiber 30 having N cores allows up to N connections between N pairs of servers 6. Each connection 37,38,39 provides communication in a single direction on a selected core, e.g. from a single transmitter to a single receiver. The connection may operate on a single wavelength (e.g. a grey wavelength) or may operate on a plurality of wavelengths in a core, all received by the same receiver.

Figure 4A:
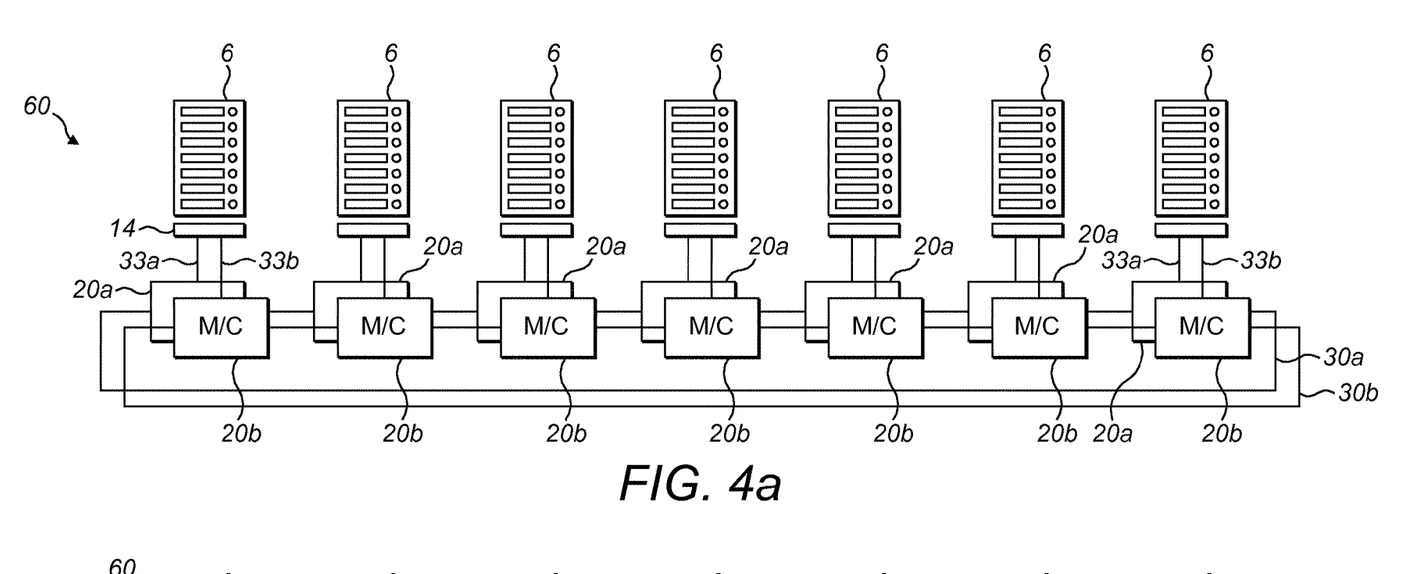
FIGS. 4a and 4b are schematic diagrams of an optical offload network node according to a physical and logical view of a further example of the disclosure, respectively.

FIG. 4*a* shows a further example of optical offload network 60, as described above for the optical offload network 50 except where described as different. The optical offload network 60 comprises, for each one or more server 6, a first optical switching arrangement 20*a* and a second optical switching arrangement 20*b*. Each optical switching arrangement 20*a*, 20*b* is as described above for the optical switching arrangement 20. The first optical switching arrangement 20*a* of each network node is connected to a first multi-core optical fiber 30*a*, and the second optical switching arrangement 20*b* of each network node is connected to a second multi-core optical fiber 30*b*. Each multi-core optical fiber 30*a*, 30*b* comprises a plurality of cores 31 as described above.

One or more optical line card 14 provides a connection between the one or more server 6 and the first optical switching arrangement 20*a* and the second optical switching arrangement 20*b*. In this example, a first set (i.e. pair) of single fiber connections 33*a* connects a first optical line card 14 to the first optical switching arrangement 20*a* and a second set (i.e. pair) of single fiber connections 33*b* connects a second optical line card 14 to the second optical switching arrangement 20*b*. Each set of single fiber connection 33*a*, 33*b* comprises two single fibers, one for each of the transmit and receive directions, as described in respect of FIG. 2. In some examples, each optical line card 14 comprises only one transmitter and one receiver. An optical line card 14 is provided for each multi-core optical fiber 30*a*, 30*b*. The optical offload network 60 comprises one optical switching arrangement 20 per server 6 and per multi-core optical fiber 30. The use of more than one multi-core fiber enables creating more than one point-to-point connections from a server to another server. Each multi-core fiber provides for a network node to establish a transmission connection to another network node and a reception connection to another network node.

Figure 4B:
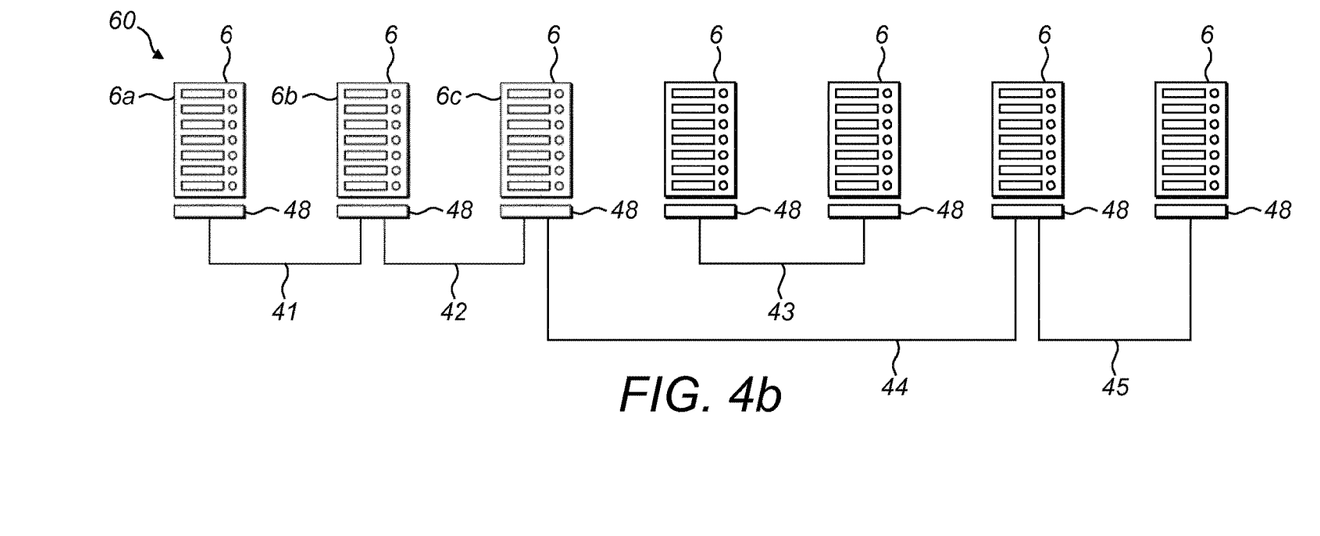

FIG. 4*b* shows a logical view of the optical offload network 60. The optical offload network 60 provides for each node comprising one or more servers 6 to be connected with a plurality of other nodes comprising one or more servers 6. The servers 6 may be connected to optical network nodes 48, corresponding to optical network nodes 28. An optical network node 48 comprises a plurality of optical switching arrangements 20*a*,20*b*, and optionally a plurality of line cards 14. In this example, the optical offload network 60 is configured to provide connections 41,42,43,44,45. For example, server 6*b* has a connection 41 to server 6*a* and a connection 42 to server 6*c*. In an example of N multi-core optical fibers (rings), each having M cores 31, the maximum number of logical point-to-point connections is N×M.

Figure 5:
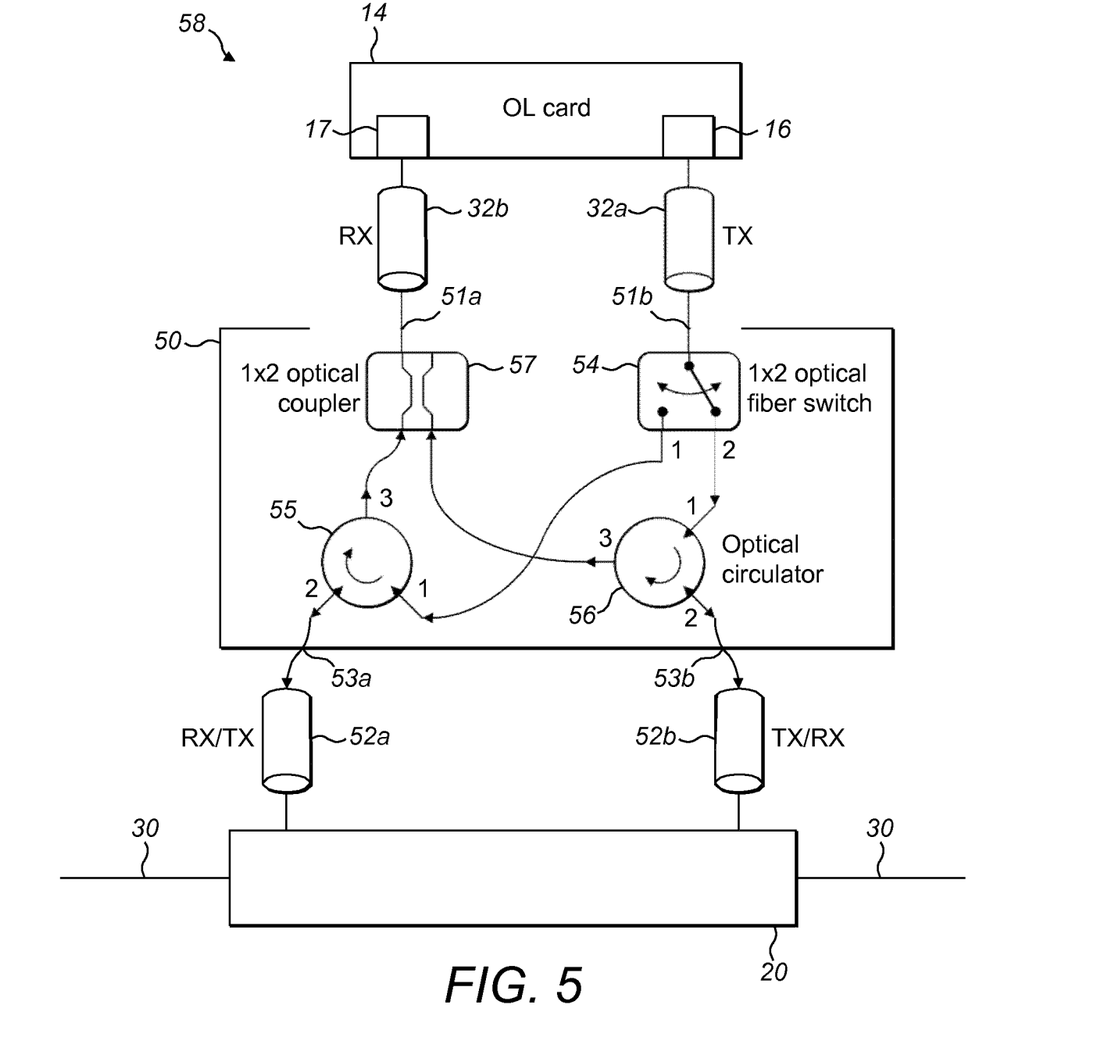
FIG. 5 is a schematic diagram of a network node according to a further example of the disclosure.

FIG. 5 shows an example optical network node 58 configured for connecting one or more server 6 with an optical offload network as described. The optical network node 58 provides for bi-directional transmission. The bi-directional transmission allows for resiliency and increased optical bandwidth exploitation.

The optical network node 58 comprises an optical line card 14 for connection to the one or more servers 6. As described above, the optical line card 14 has a transmitter 16 connected to a first single core fiber 32*a*, and a receiver 17 connected to a second single core fiber 32*b*. The optical line card 14 is not directly connected to the optical switching arrangement 20; instead the optical line card 14 is connected to a bi-directional module 50. The bi-directional module 50 comprises a first port 51b is connected to the optical line card 14 by the first single core fiber 32a, and a second port 51a connected to the second single core fiber 32b.

The bi-directional module 50 comprises a third port 53a and a fourth port 53b to connect to the optical switching arrangement 20. Each of the ports 53a,53b provides for either transmission or receiving of optical signals. When one of the third or fourth ports 53a,53b provides for transmitting an optical signal, the other of the third or fourth ports provides for receiving an optical signal. The third port 53a is connected to the first primary switch 22 of the optical switching arrangement 20, e.g. via a third single core optical fiber 52a. The fourth port 53b is connected to the second primary switch 23 of the optical switching arrangement 20, e.g. via a fourth single core optical fiber 52b (corresponding to the single core optical fibers in FIG. 2). The bi-directional module 50 provides for the first primary switch 22 and first secondary switches 18 to operate in either transmission or receive to/from a first direction on the multi-core optical fiber 30, e.g. West. The bi-directional module 50 provides for the second primary switch 23 and second secondary switches 19 to operate in either transmission or receive to/from a second direction on the multi-core optical fiber 30, e.g. East. This is contrast to the example of FIG. 2, in which the optical signals in transmission and receive were carried in the same direction on the multi-core optical fiber 30, e.g. transmission to West, reception from East, or anti-clockwise on a ring.

The bi-directional module 50 comprises optical components configured to pass an optical signal received from the second port 32a to a selected one of the third or fourth ports 52a, 52b for transmission in a selected direction on the multi-core optical fiber 30. The bi-directional module 50 comprises optical components configured to pass a received optical signal on either the third or fourth ports 52a,52b to the first port 32b for receiving by the optical line card 14. The bi-directional module 50 comprises a switch 54. The switch 54 has an input from the second port 51b, for receiving an optical signal from the optical line card 14 for transmission. The switch 54 is configured to switch the optical signal to one of two output ports. The selection of the output port of the switch 54 determines the transmit and receive direction of the optical network node 58. The switch 54 may be considered as a 1×2 optical fiber switch.

The output ports of the switch 54 are connected to a first optical circulator 55 and a second optical circulator 56 respectively. The first optical circulator 55 is configured to pass an optical signal received from the switch 54 to the third port 53a for transmission by the optical switching arrangement 20 in the first direction. The second optical circulator 56 is configured to pass an optical signal received from the switch 54 to the fourth port 53b for transmission by the optical switching arrangement 20 in the second direction.

The bi-directional module 50 comprises an optical coupler 57. The first optical circulator 55 is configured to pass an optical signal received from the optical switching arrangement 20 (from multi-core optical fiber extending in the first direction) to the optical coupler 57. The second optical circulator 56 is configured to pass an optical signal received from the optical switching arrangement 20 (from multi-core optical fiber extending in the second direction) to the optical coupler 57. The optical coupler 57 is configured to pass the received optical signal from either direction to the first port 51a, for receiving by the receiver 17 of the optical line card 14. The optical coupler 57 may be considered as a 1×2 optical coupler.

The optical circulators 55,56 are configured to pass the optical signal for transmission only towards the optical switching arrangement 20, and are configured to pass the received optical signal only towards the optical line card 14.

The bi-directional module 50 provides for reversing a direction of communication on the multi-core optical fiber 30 (e.g. in the form of a ring), for example, in case of a failure. This may allow for continuing to transport traffic, e.g. in the event of a network node failure.

In addition, the bi-directional module 50 provides for using a same arc on the ring to be used for communicating in two opposite directions. Another part of the ring, i.e. a complementary arc, is thus available for establishing communication between other servers. In case of N rings, each having M cores, the number of logical point-to-point connections may be more than N×M.

Aspects of the disclosure provide an optical node, in a data center, to connect a conventional server 6 to an internal optical offload network. The optical node is based on a combination of single core and multicore optical fibers arranged via a set of optical fiber switches to provide a reconfigurable assignment of multiple optical offload channels to the servers 6. The described examples add to conventional servers 6 an optical connectivity, as an alternative to the existing packet connectivity, e.g. for elephant flows.

Figure 6:
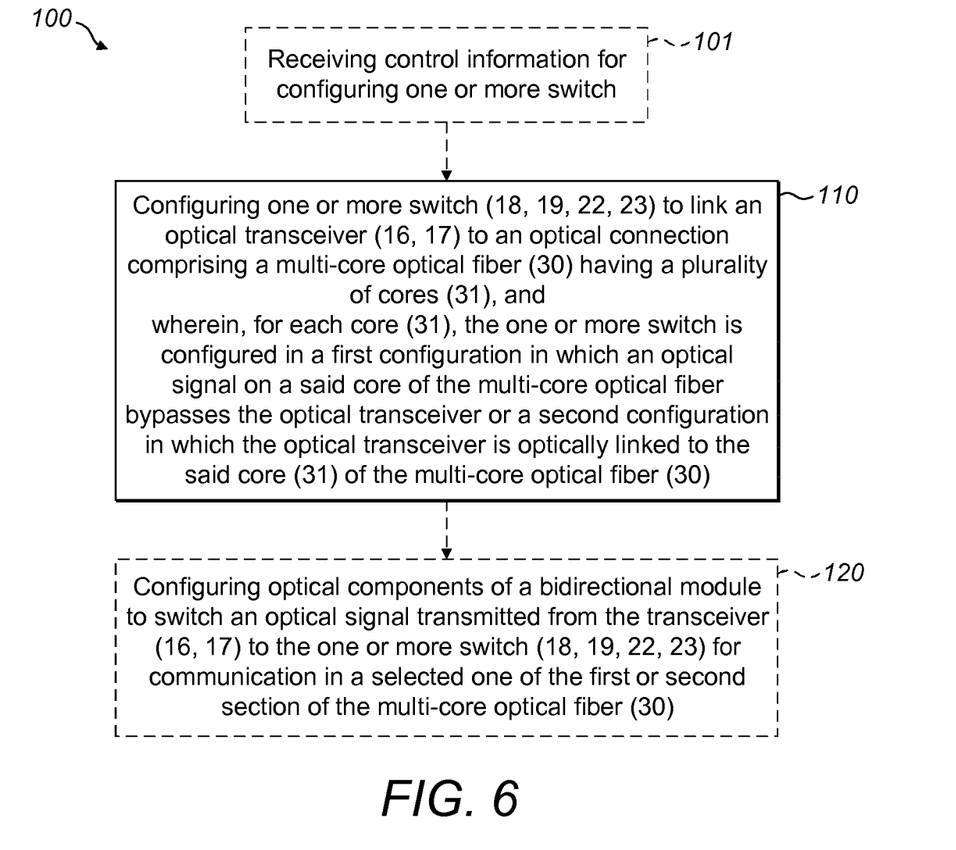
FIG. 6 is a flow chart of a method of operating a data center network node according to an embodiment.

FIG. 6 is a flow chart illustrating a method 100 by which a network node may be operated according to an embodiment. The method 100 shows example steps of the switching arrangement 20 of a node.

In 101, the method optionally comprises receiving control information for configuring one or more switch, e.g. the primary and secondary switches, and the switch 54 in the bi-directional module if present, as described above.

In 110, the method comprises configuring one or more switch 18,19,22,23 to link an optical transceiver (16,17) to an optical connection comprising a multi-core optical fiber 30 having a plurality of cores 31. For each core 31, the one or more switch is configured in a first configuration in which an optical signal on a said core of the multi-core optical fiber bypasses the optical transceiver or a second configuration in which the optical transceiver is optically linked to the said core 31 of the multi-core optical fiber.

In 120, the method optionally comprises configuring optical components of a bi-directional module, if present, to switch an optical signal transmitted from the transceiver 16,17 to the one or more switch 18,19,22,23 for communication in a selected direction of the multi-core optical fiber 30, e.g. one of the first or second section of the multi-core optical fiber 30. For example, the configuring is a setting of switch 54 to a select a section of multi-core fiber for transmission. The configuring 110,120 may take place in parallel (concurrently) or consecutively.

Figure 7:
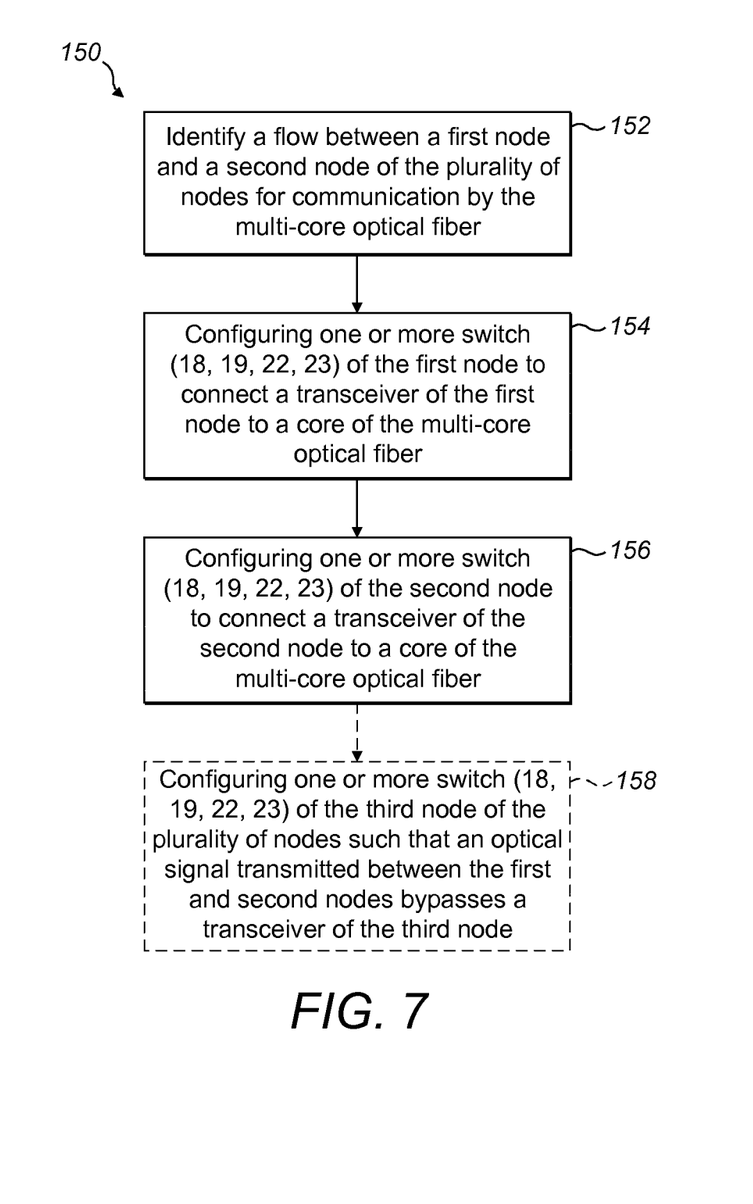
FIG. 7 is a flow chart of a method of operating a data center network according to an embodiment.

FIG. 7 is a flow chart illustrating the steps of a method 150 of operating a data center network according to an embodiment. The data center network optionally comprises a first (conventional) subnetwork, the optical offload network and a plurality of nodes, e.g. at least three nodes. The optical offload subnetwork comprises an optical path provided by multi-core fiber, each node connectable to the optical path and comprising one or more switches in a switching arrangement 20 configurable between a first configuration in which the optical path bypasses the optical transceiver and a second configuration in which the optical path is optically connected to the optical transceiver. In some examples, the node may be considered as comprising an optical transceiver or a port to connect to an optical transceiver.

The method comprises steps for controlling the optical offload network, e.g. by an orchestrator or controller. In 152, the method comprises identifying a flow between a first node and a second node of the plurality of nodes for communication by the multi-core optical fiber.

In 154, the method comprises configuring one or more switch 18,19,22,23,54 of the first node to connect a transceiver of the first node to a core 31 of the multi-core optical fiber 30. In some aspects, the one or more switch 18,19,22, 23,54 is the first and/or second primary and/or secondary switches, and optionally the bi-directional module switch, 18,19,22,23,54 described above.

In 156, the method comprises configuring one or more switch 18,19,22,23,54 of the second node to connect a transceiver of the second node to the core of the multi-core optical fiber. In some aspects, the one or more switch, 18,19,22,23,54 is the first and/or second primary and/or secondary switches and optionally the bi-directional module switch, 18,19,22,23,54 described above.

In 158, the method optionally comprises configuring the one or more switch 18,19,22,23 of a third node of the plurality of nodes such that an optical signal transmitted between the first and second nodes bypasses a transceiver of the third node. In some aspects, the one or more switch 18,19,22,23 is the first and/or second primary and/or secondary switches described above. In some examples, the configuring 154,156,158 is by the controller (i.e. network controller) transmitting one or more control signals to the first, second and/or third (or further) nodes. The controller 25 (i.e. node controller) is configured to receive the one or more control signals to configure (i.e. set) the one or more switches in the respective first, second and/or third (or further) nodes. The configuring 154,156,158 may take place in parallel (concurrently) or consecutively.

The method establishes a point-to-point link between the first network node and the second network node. The point-to-point optical link is configured by the configuring the switching arrangement of the first network node to be in the second configuration, i.e. connecting the transceiver to the optical link. The flows handled by the offload network are relatively large flows, i.e. an elephant flow. Smaller flows are handled by the packet switched network 7. A determination that a particular flow is an elephant flow may be made by the orchestrator or another data center controller.

The definition of an elephant flow may be based on one or more criteria. For example, a flow may be determined to be an elephant flow if it is determined to require, or uses, a high bandwidth. For example, the flow is determined to be an elephant flow if it has a characteristic, e.g. required bandwidth or size which is determined to be more than a threshold. For example, the flow is determined to be an elephant flow if it is (or will be) using more than a predetermined threshold of the network or link capacity, e.g. during a given measurement interval. A flow is a set of packets that match the same properties, such as source/destination ports (e.g. TCP ports). For the purpose of this disclosure, an elephant flow, also referred to as a high bandwidth flow, is any flow which has a characteristic, which when compared to a threshold, is determined to be best carried on the offload network. For example, the high bandwidth flow may be identified if requiring more than a given threshold of network capacity, e.g. based on the capacity of the first subnetwork (i.e. using the switch (8)).

In an embodiment, high bandwidth flows which may be offloaded onto the optical offload network are identified by using a threshold related to network capacity. Typically, this threshold relates to available bandwidth. Flows which have a bandwidth requirement above the threshold are designated as high bandwidth flows and the capacity demands associated with them are referred to as high bandwidth flow demands. The threshold may be set by the operator or set in a default. The threshold may be set such that the offload network, which can only be configured for one point-to-point connection, is not overwhelmed by a large number of demands.

Aspects of the disclosure relate to data centers with a large number of servers where pairs of servers often need to exchange elephant flows. The described optical based architecture allows creation temporary, full-duplex, optical offload channels to transport elephant flows. The disclosure uses multicore optical fibers, for example in combination with single core fibers, arranged via a set of optical switches to provide a reconfigurable assignment of one or more optical offload channels to the servers.

The described system is based on simple fiber switches and multicore fibers directly connected with the optical transducers. A use of expensive fan in/fan out of the cores 31 of the multi-core fiber 31 is avoided by the described arrangement, since separation of cores of the multicore fibers is performed inside the switch itself. The fiber switches described are configured to switch optical signals between optical fibers. In some aspects, the fiber switches are configured to switch all optical signals on a core of the multi-core fiber 30 to another optical fiber.

Examples of the disclosure may mitigate the impact of elephant flows on the packet layer by moving the elephant flows to a dedicated optical infrastructure. Small flows ("mice") can be served better by a relieved packet (L2/L3) layer. The optical offload network is "independent" on the L2/L3 connectivity. Thus, a failure at the optical layer merely inhibits the use of the optical offload channels, but does not affect the communication among servers that can continue at the packet (L2/L3) layer, even if degraded.

In some aspects, the offload optical channels provided by the optical offload network may act as backup paths in case of failure of the connectivity at the packet (L2/L3) layer between a server and a Layer 2 switch or between a pair of servers. The bi-directional module described enables bi-directionality on the optical offload network (ring). This allows for recovery at the optical layer. The optical offload network (i.e. infrastructure) can be upgraded, for example, to migrate to interfaces at higher bitrates, by temporary disabling the offload mechanism. The offload optical channel can facilitate the maintenance or upgrade of the packet layer (e.g. L2 cards) on the servers by provisionally providing an alternative connection. In some aspects, for example in conjunction with the installation of new servers, the devices described may be replaced with active devices providing alternative switching arrangements, re-using the fiber cabling installed as described.

Figure 8:
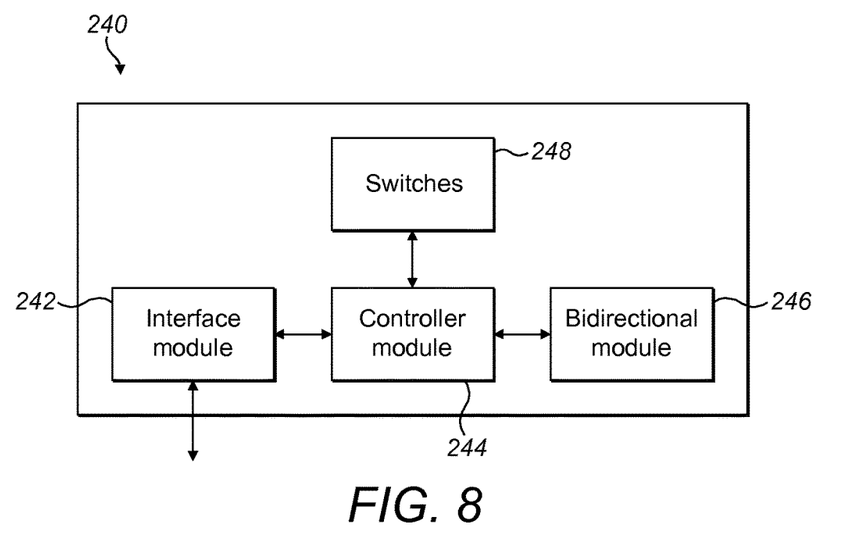
FIG. 8 is a diagram of units of a node controller according to an embodiment.

FIG. 8 shows an example network node 240 corresponding to the switching arrangement 20, optionally including the bi-directional module 50, or any example of network node 48,58. The network node 240 provides for a controlled connection of the optical line card 14 to the multi-core fiber as part of the optical offload network.

The network node 240 comprises an interface module 242 configured to receive control signals from a network controller (not shown) for configuring the network node. The interface module 242 is configured to pass the received control signals to a controller module 244, e.g. corresponding to node controller 20. The controller module 244 may be implemented with one or more processor and memory. The controller module is configured to control one or more switches 248, e.g. the primary and secondary switches 18,19,22,23 described. The one or more switches 248 may alternatively be considered as a switch unit or a switch module. If present, the controller module 244 is configured to control the bi-directional module 246, corresponding to the bi-directional module 50 described.

Figure 9:
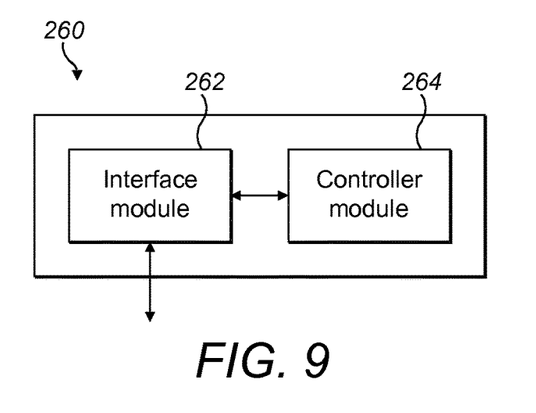
FIG. 9 is a diagram of units of a network controller according to a further embodiment.

FIG. 9 shows an example network controller 260. The controller comprises an interface module 262 configured to transmit control signals to a network node 20,48,58,240 of any example. The control signals for transmission are generated by the controller module 264. The controller module 264 may be implemented with one or more processor and memory. The controller module 264 is configured to receive information identifying a flow between a first node and a second node of the plurality of nodes for communication by the multi-core optical fiber. The controller module 264 is configured to generate control signals for the network nodes, in order to configure the one or more switches, e.g. primary and secondary switches, to transmit, receive (and optionally bypass) the optical signals to configure an optical data connection. The one or more switches are configured for each core 31.

Figure 10:
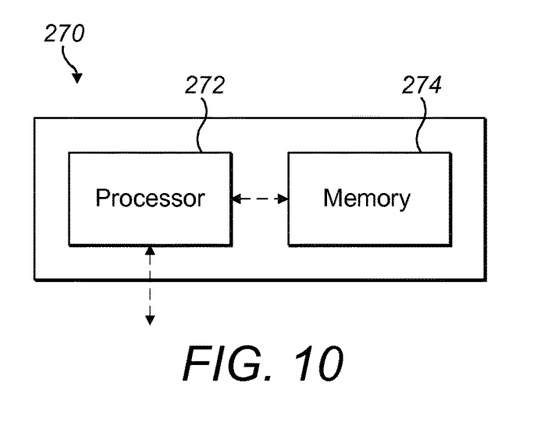
FIG. 10 is a diagram of a structure of a controller according to a further embodiment.

FIG. 10 shows an example of the node controller 25 or network controller, or a controller module 244,264, as a processing apparatus 270 which may be implemented as any form of a computing and/or electronic device, and in which embodiments of the system and methods described above may be implemented. Processing apparatus may implement all, or part of, the method shown or described. The processing apparatus comprises one or more processors 272 which may be microprocessors, controllers or any other suitable type of processors for executing instructions to control the operation of the device. The processor 272 may be considered as processing circuitry. The processor 272 is connected to other components of the node. Processor-executable instructions may be provided using any computer-readable media, such as memory 274. The processor-executable instructions can comprise instructions for implementing the functionality of the described methods. The memory 274 is of any suitable type such as read-only memory (ROM), random access memory (RAM), a storage device of any type such as a magnetic or optical storage device. Additional memory 274 can be provided to store data used by the processor 272. The processing apparatus 270 comprises one or more network interfaces for interfacing with other network entities.

An aspect of the disclosure provides a computer program, comprising instructions which, when executed on at least one processor, cause the at least one processor to carry out a method according to any example. For example, the computer program may be executed by the orchestrator or network node. An aspect of the disclosure provides a computer program product comprising a computer program of any example. An aspect of the disclosure provides a carrier containing the computer program product of any example, wherein the carrier optionally includes an electrical signal, an optical signal, a radio signal, a magnetic tape or disk, an optical disk or a memory stick.

In some examples, the offload optical channel (i.e. subnetwork) may act as a backup path in case of failure of the connectivity at L2/L3 (i.e. packet switched network 7) between a server and the L2 switch or between a pair of servers. In some examples, the offload optical channel may also facilitate the maintenance or upgrade of the packet switched network 7 (e.g. L2 cards) on the servers by provisionally providing an alternative connection.

The term server is used as an example of processing arrangement and/or data storage unit. Examples of the disclosure are applicable to connecting any processing arrangements together which are co-located, e.g. digital units for baseband processing. Aspects are applicable in any environment where different subnetworks are used to connect different processing units, allowing offload of larger/high bandwidth flows to the point-to-point connection of the optical offload subnetwork. Any example described or shown may be used in any combination with any other.

The invention claimed is:

1. A data center network node, comprising:
   a connection to a packet switched network for communication with other servers in the data center and/or external networks;
   an optical switching arrangement comprising one or more switches configured to link an optical transceiver to an optical connection comprising a multi-core optical fiber having a plurality of cores; and
   for each core of the multi-core optical fiber, the one or more switches is configurable between:
      a first configuration in which an optical signal on that core bypasses the optical transceiver; and
      a second configuration in which the optical transceiver is optically linked to that core.

2. The data center network node of claim 1, wherein the one or more switches comprises:
   one or more primary switches configured to connect the optical transceiver to at least a selected one of the cores of the multi-core optical fiber; and
   one or more secondary switches configurable between the first configuration and the second configuration, wherein the one or more secondary switches in the second configuration are configured to connect the core of the multi-core fiber to the one or more primary switches.

3. The data center network node of claim 2, wherein, in the second configuration, the one or more primary switches are configured to connect the optical transceiver to a selected secondary switch for connection to at least one selected core of the multi-core optical fiber.

4. The data center network node of claim 2:
   wherein the one or more primary switches and one or more secondary switches comprise:
   a first primary switch connected to a set of first secondary switches; and
   a second primary switch connected to a set of second secondary switches;
   wherein a first secondary switch and a second secondary switch are connected to a core of the multi-core fiber.

5. The data center network node of claim 4:
   wherein the first primary switch is configured to communicate with a first section of multi-core optical fiber; and
   wherein the second primary switch is configured to communicate with a second section of multi-core optical fiber.

6. The data center network node of claim 1:
   further comprising a bi-directional module comprising optical components, wherein the optical components are configured to switch an optical signal transmitted from the transceiver to the one or more switches for communication in a selected direction of the multi-core optical fiber; and wherein the optical components are further configured to couple an optical signal received from either direction of the multi-core optical fiber to the transceiver.

7. A method of operating a node in a data center network, the method comprising:
  providing a connection to a packet switched network for communication with other servers in the data center and/or external networks; and
  configuring an optical switching arrangement comprising one or more switches to link an optical transceiver to an optical connection comprising a multi-core optical fiber having a plurality of cores; and
  wherein, for each core of the multi-core optical fiber, the one or more switches is configured either in a first configuration in which an optical signal on that core bypasses the optical transceiver or a second configuration in which the optical transceiver is optically linked to that core.

8. The method of claim 7, wherein the configuring one or more switch comprises:
  configuring one or more primary switches to connect the optical transceiver to at least a selected one of the cores of the multi-core optical fiber; and
  configuring one or more secondary switches to the first configuration or the second configuration, wherein the one or more secondary switches in the second configuration are configured to connect the selected core to the one or more primary switches.

9. The method of claim 7, further comprising configuring optical components of a bi-directional module to switch an optical signal transmitted from the transceiver to the one or more switches for communication in a selected direction of the multi-core optical fiber.

10. A method of operating a data center network, the network comprising a plurality of nodes connected by a packet switched network for communication between the nodes in the data center network and/or external networks and connected by sections of a multi-core optical fiber, the method comprising:
  identifying a flow between a first node and a second node of the plurality of nodes for communication by the multi-core optical fiber;
  configuring one or more switches of the first node to connect a transceiver of the first node to a core of the multi-core optical fiber; and
  configuring one or more switches of the second node to connect a transceiver of the second node to the core of the multi-core optical fiber.

11. The method of claim 10, further comprising: configuring one or more switches of a third node of the plurality of nodes such that an optical signal transmitted between the first and second nodes bypasses a transceiver of the third node.

12. A data center network controller configured to control a network comprising a plurality of nodes connected by a packet switched network for communication between the nodes in the data center network and/or external network and connected by sections of a multi-core optical fiber, the data center network controller comprising:
  processing circuitry;
  memory containing instructions executable by the processing circuitry whereby the data center network controller is operative to:
    identify a flow between a first node and a second node of the plurality of nodes for communication by the multi-core optical fiber;
    configure one or more switches of the first node to connect a transceiver of the first node to a core of the multi-core optical fiber; and
    configure one or more switches of the second node to connect a transceiver of the second node to the core of the multi-core optical fiber.

* * * * *